(12) United States Patent
Choi

(10) Patent No.: US 7,774,009 B2
(45) Date of Patent: Aug. 10, 2010

(54) MOBILE COMMUNICATION TERMINAL FOR SETTING BACKGROUND MUSIC DURING TELEPHONE CONVERSATION AND METHOD THEREOF

(75) Inventor: Sung-Bum Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 647 days.

(21) Appl. No.: 11/375,100

(22) Filed: Mar. 15, 2006

(65) Prior Publication Data
US 2006/0211455 A1 Sep. 21, 2006

(30) Foreign Application Priority Data
Mar. 16, 2005 (KR) .................. 10-2005-0021958

(51) Int. Cl.
*H04B 7/00* (2006.01)
(52) U.S. Cl. .................. 455/518; 455/419; 455/420; 455/414.1
(58) Field of Classification Search .................. 455/518
See application file for complete search history.

(56) References Cited

U.S. PATENT DOCUMENTS

| 2002/0082007 | A1* | 6/2002 | Hoisko et al. ............... 455/426 |
|---|---|---|---|
| 2004/0202303 | A1* | 10/2004 | Costa-Requena et al. ............... 379/205.01 |
| 2005/0050090 | A1* | 3/2005 | Kawahata et al. ......... 707/103 Y |
| 2005/0101262 | A1* | 5/2005 | Lee et al. ...................... 455/76 |
| 2006/0002328 | A1* | 1/2006 | Naghian ..................... 370/328 |
| 2006/0104260 | A1* | 5/2006 | Croak et al. ................ 370/352 |

FOREIGN PATENT DOCUMENTS

CN 1378755 A 11/2002

* cited by examiner

*Primary Examiner*—Rafael Pérez-Gutiérrez
*Assistant Examiner*—Yungsang Lau
(74) *Attorney, Agent, or Firm*—Birch, Stewart, Kolasch & Birch LLP

(57) ABSTRACT

A mobile communication terminal for setting a background music during a phone conversation and a method thereof, the mobile communication terminal comprising a transceiver for receiving a message including information of a storing path of a pre-set call background music, and a controller for requesting and downloading the call background music on the basis of the received message.

21 Claims, 4 Drawing Sheets

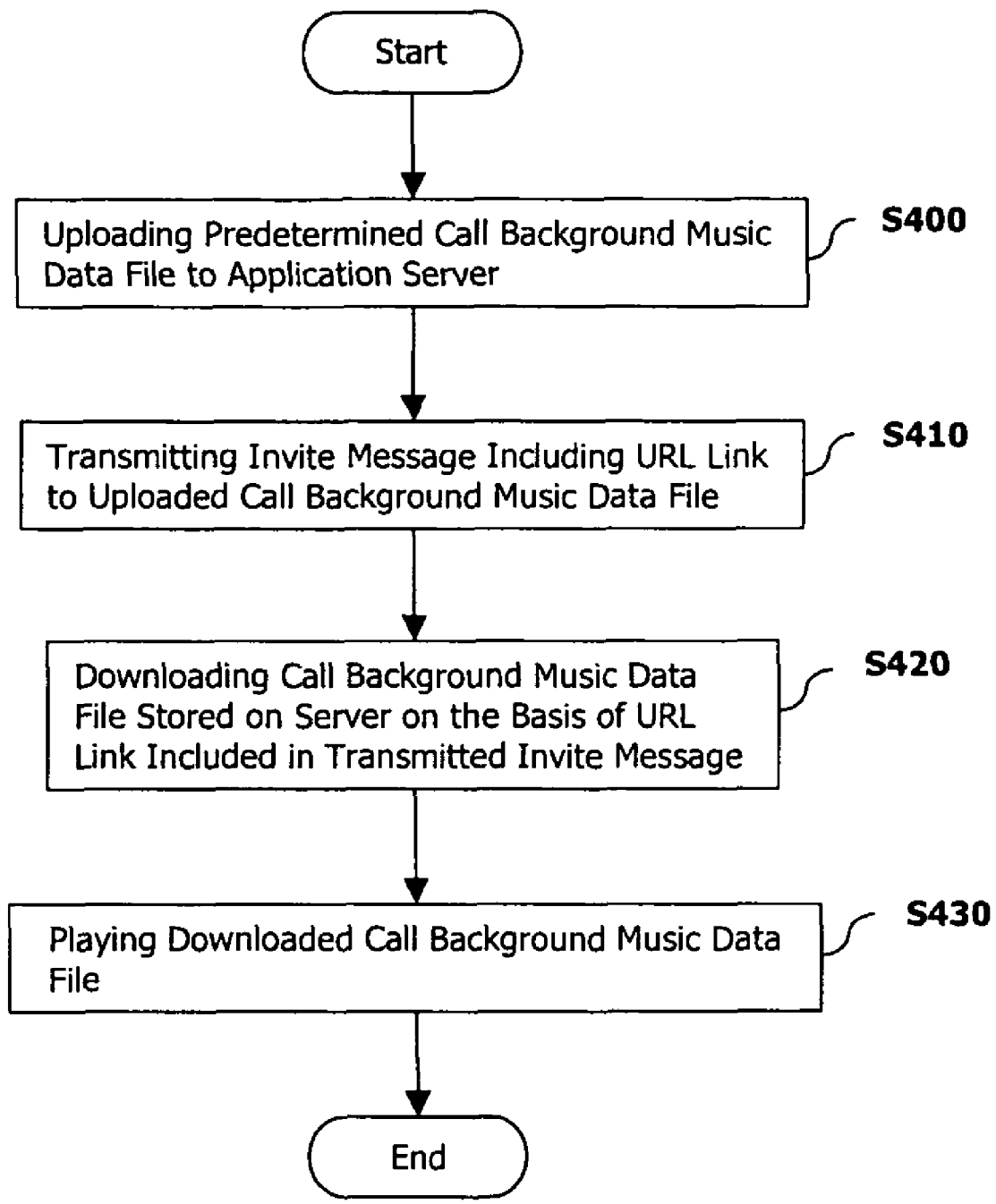

MOBILE COMMUNICATION TERMINAL FOR SETTING BACKGROUND MUSIC DURING TELEPHONE CONVERSATION AND METHOD THEREOF

BACKGROUND OF THE INVENTION

1. Field of the Invention

The present invention relates to a mobile communication terminal, and particularly, to a mobile communication terminal for setting a background music during a telephone conversation which is capable of improving user convenience with respect to a so-called "Push-To-Anything" or PTX (Push-To-X) service, and a method thereof.

2. Description of the Related Art

Recently, according to an enhancement of functions of mobile communication terminals (e.g., mobile stations, handsets, user equipment, etc.), various functions such as a camera function, a multimedia playing function or the like have been provided in the terminals in addition to a function of a simple voice communications. As these camera functions and the multimedia playing functions are convenient functions which are gradually becoming more popular due to improvements in the display capabilities of the mobile communication terminal. With the continuing development of high speed communications, mobile communication terminals equipped with a digital camera of high resolution and a LCD (Liquid Crystal Display) screen are being widely used.

In addition, mobile communication terminals providing a PTX (Push-To-X) service, such as PTT (Push-To-Talk), PTV (Push-To-View), and IM (Instant Messaging) are being developed. The PTX service is a half-duplex communication method in which one user may perform voice communications with multiple users who may listen, similar to the so-called walkie-talkie communication scheme. Thus, the PTX service provides a one-to-one or one-to-many conversation service, but only one party can transmit at a time.

In this manner, a conventional mobile phone conversation can be performed through bi-directional communications that does not distinguish between an originating party and a receiving party. However, in the half-duplex communication type PTX service, the originating party and the receiving party are distinguished because the current speaker can be considered as the originating party and multiple users must take turns when speaking. An operation principle of a mobile communications system which supports the PTX service according to the related art will be explained with reference to FIG. 1.

FIG. 1 illustrates an operation principle of a mobile communications system which supports a PTX service according to the related art.

As shown in FIG. 1, a mobile communications system which supports a PTX service according to the related art includes a transmitting side mobile communication terminal (mobile station or "MS") 110 transmitting multimedia data by a user using a PTX key (or other activation function) mounted (or otherwise provided) in the mobile communication terminal, a PTX (Push To X) server 120 forwarding the transmitted multimedia data, and a receiving side mobile communication terminal 130 receiving the forwarded multimedia data.

The operation principal of the mobile communications system supporting the PTX service according to the related art will be explained as follows.

First, a PTX key (or other activation means) for setting a call or requesting a say is mounted (or otherwise provided) in the mobile communication terminal and a user attempts to set the call by pressing the PTX key. That is, the transmitting side mobile communication terminal 110 transmits a request (e.g., an INVITE message) for requesting the call setting by the user to the PTX server 120.

The PTX server 120 receives the INVITE message and checks the location of a corresponding receiving side mobile communication terminal 130 on the basis of the received INVITE message. As a result, the PTX server 120 may set a session between the receiving side mobile communication terminal 130 and the transmitting side mobile communication terminal 110 through use of a Session Initiation Protocol (SIP). However, when the PTX server 120 does not set the session between the receiving side mobile communication terminal 130 and the transmitting side mobile communication terminal 110, for instance, when the receiving side mobile communication terminal is in a shaded region (e.g., the receiving user is in a location or situation where communication cannot be properly performed) or is in a reception rejecting state (e.g., an option that rejects session invitations has been set), the PTX server 120 may send an error message to the transmitting side mobile communication terminal 110, and accordingly the transmitting side mobile communication terminal 110 can not transmit and/or receive multimedia data such as audio, video, text or the like to/from the receiving side mobile communication terminal 130.

If possible, the transmitting side mobile communication terminal 110 then transmits the multimedia data to the PTX server 120, and accordingly the PTX server 120 forwards the transmitted multimedia data to the receiving side mobile communication terminal 130, in which the session has been set, through use of a Real Time Protocol (RTP).

However, in the mobile communications system supporting the PTX service according to the related art, because only multimedia data is transmitted to the receiving side mobile communication terminal for which a session has been set, it is impossible to improve convenience for users with respect to the PTX service during the PTX telephone conversation state.

SUMMARY OF THE INVENTION

Therefore, one feature of the present invention to provide a mobile communications terminal for setting a background music during a telephone conversation which is capable of improving convenience for a user with respect to a PTX (Push-To-X) service, by transmitting an INVITE message including a URL (Uniform Resource Locator) link of a call background music to a receiving side mobile communication terminal, and method thereof.

To achieve these and other advantages and in accordance with the purpose of the present invention, as embodied and broadly described herein, there is provided a mobile communications terminal for setting a background music during a telephone conversation comprising: a transceiver for receiving a message including information of a storing path of a preset call background music; and a controller for requesting and downloading the call background music based upon the received message.

To achieve these and other advantages and in accordance with the purpose of the present invention, there is provided a method for setting a background music during a telephone conversation via a mobile communications terminal comprising: receiving a message including information of a storing path of a preset call background music; and requesting and downloading the call back ground music on the basis of the received message.

To achieve these and other advantages and in accordance with the purpose of the present invention, a mobile communications system for setting a background music during a telephone conversation can comprise: a transmitting side mobile communications terminal for sending a message including information of a storing path of a preset call background music to an application server; and a receiving side mobile communications terminal for requesting and downloading the call background music stored on the application server on the basis of the storing path information included in the sent message.

According to another embodiment of the present invention, there is provided a method for setting a background music during a telephone conversation via a mobile communication terminal including: a step in which a transmitting side mobile communication terminal transmits a message including information of a storing path of a preset call background music data file to a receiving side mobile communication terminal through an application server; and a step in which the receiving side mobile communication terminal requests and downloads the call background music data file stored on the application server on the basis of the storing path information in the transmitted message.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a flow chart of a method for setting a background music during a telephone conversation via a mobile communication terminal according to the present invention.

DETAILED DESCRIPTION OF THE INVENTION

Reference will now be made in detail to some embodiments of the present invention, examples of which are illustrated in the accompanying drawings.

Hereinafter, with reference to the accompanying drawings, explanation will now be give in detail for a mobile communications terminal for setting a background music during a telephone conversation according to the present invention which is capable of improving convenience for a user with respect to a PTX (Push-To-X) service by transmitting an INVITE message including a URL (Uniform Resource Locator) link of a call background music to a receiving side mobile communication terminal, and method thereof.

The PTX service of a mobile communication terminal (e.g., mobile station, handset, user equipment, etc.) according to the present invention may support a PTT (Push-To-Talk) service for audio data service, a PTV (Push-To-View) for video data service, and an IM (Instant Messaging) service for text data.

An operation principle of a mobile communications system for setting a background music during a telephone conversation according to the present invention which provides the PTX service will be explained with reference to FIG. 2.

Figure 1:
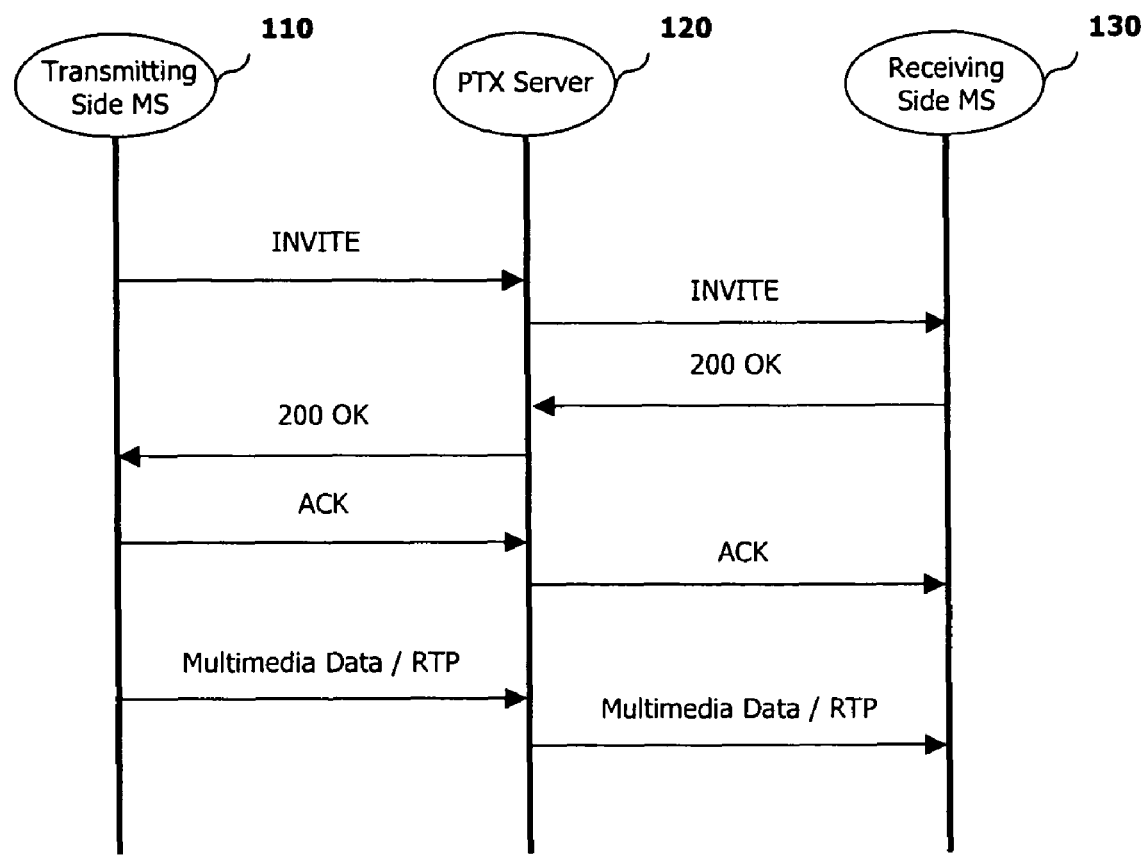
FIG. 1 illustrates an operation principle of a mobile communications system supporting a PTX service according to the related art.
Figure 2:
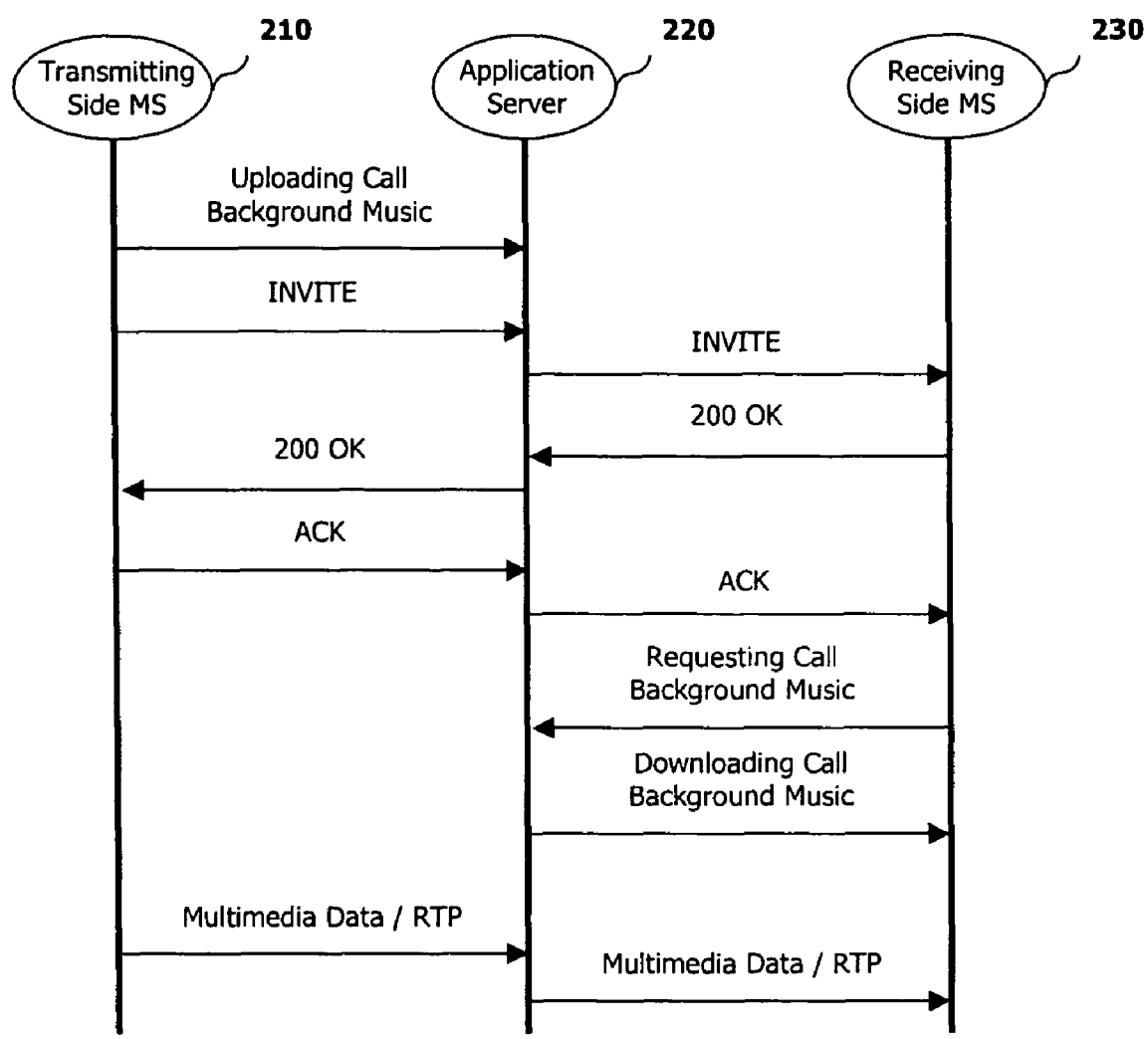
FIG. 2 illustrates an operation principle of a mobile communications system for setting a background music during a telephone conversation according to the present invention.

FIG. 2 illustrates the operation principle of a system for setting a background music during a phone conversation via a mobile communication terminal according to the present invention.

As shown in FIG. 2, the system for setting the background music during a phone conversation of the mobile communication terminal according to the present invention includes a transmitting side mobile communication terminal (mobile station or "MS") 210 sending a request (e.g., an INVITE message) including a URL link of a call background music, an application server 220 forwarding the thusly sent INVITE message, and a receiving side mobile communication terminal 230 playing the call background music on the basis of the forwarded INVITE message.

The mobile communications terminal for setting the background music during a phone conversation according to the present invention will now be explained further with reference to FIG. 3.

Figure 3:
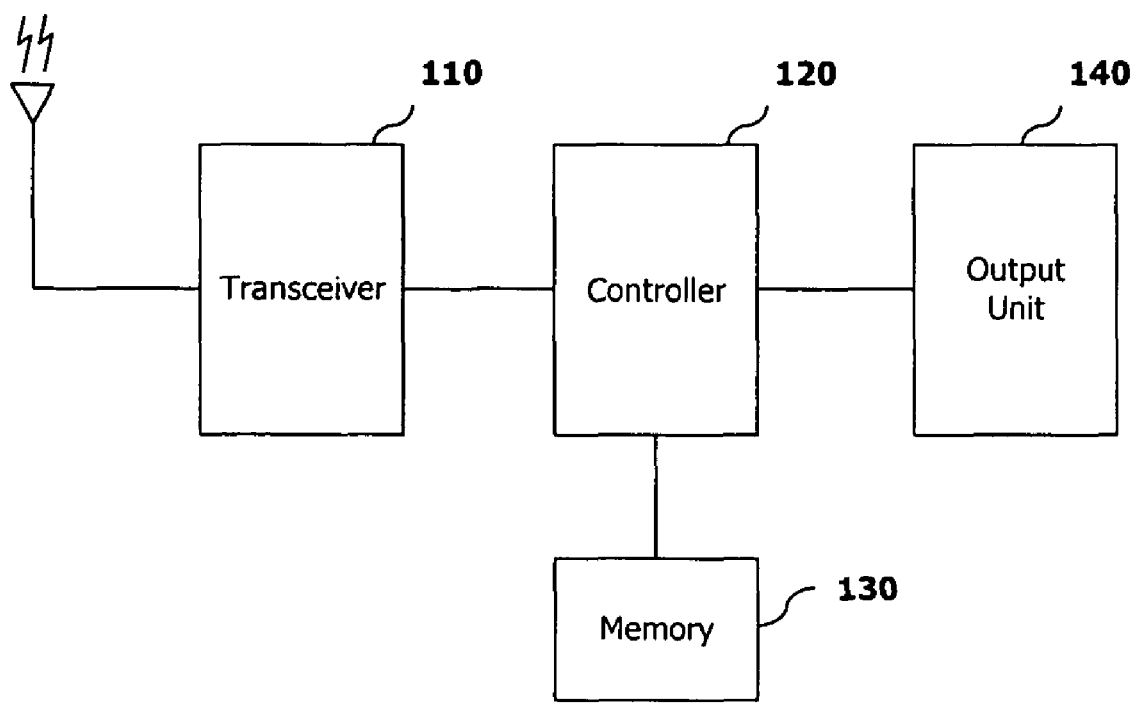
FIG. 3 illustrates a construction of a mobile communications terminal for setting the background music during a telephone conversation according to the present invention.

FIG. 3 illustrates a construction of a mobile communication terminal for setting the background music during a telephone conversation according to the present invention.

As illustrated in FIG. 3, a mobile communication terminal for setting a background music during a telephone conversation according to the present invention may include a transceiver 110 for receiving a request (e.g., an INVITE message) including a URL link of a preset call background music, a controller 120 for requesting the call background music on the basis of the received INVITE message, a memory 130 for downloading and storing the requested call background music, and an output unit 140 for playing the stored call background music.

An exemplary method for setting a background music during a phone conversation via a mobile communication terminal according to the present invention will be explained with reference to FIG. 4.

FIG. 4 is a flow chart showing the method for setting a background music during a phone conversation via a mobile communication terminal according to the present invention.

As shown in FIG. 4, the method for setting the background music during the phone conversation via the mobile communication terminal according to the present invention includes receiving a request (e.g., an INVITE message) including a URL link of a pre-set call background music (S410), requesting the call background music on the basis of the received INVITE message (S420), downloading and storing the requested call background music (S430), and playing the stored call background music (S440).

The method for setting the background music during the phone conversation via the mobile communication terminal according to the present invention will be explained in more detail as follows.

First, the transmitting side mobile communication terminal 210 uploads a call background music data file to an application server 220, such as a PTT (Push-To-Talk) server or a presence server (S300). The URL link to the uploaded call background music data file may be added into a contents field of the INVITE message. Here, a part of the contents field into which the URL link to the call background music data file is added as an XML (Extensible Markup Language) text type, which will be described in more detail as follows.

```xml
<?xml version="1.0"?>
<gts-info xmlns="http://sktims.net/cpim_pidf/gts_info">
    <type>MY_LIST_INFO</type>
    <requester id="sip:01192298384@sktims.net"
        CallBGM="http://sktims.net/cpim_pidf/gts_info/CallBGM/
music(i.e., title of music) .mp3">
    </requester>
    <my-list-info>
       < buddy id="sip:01193432332@sktims.net"></buddy>
    </my-list-info>
```

Thus, the transmitting side mobile communication terminal 210 can upload one or more call background music data files to the application server 220 and select one of the uploaded call background music data files. That is, the transmitting side mobile communication terminal 210 can set different call background music files for one or more receiving side mobile communication terminals 230.

The transmitting side mobile communication terminal 210 transmits a request (e.g., an INVITE message) including a URL link to the uploaded call background music data file to the application server 220, and accordingly the application server 220 receives the INVITE message and transmits the received INVITE message to the receiving side mobile communication terminal 230.

During this operation, the application server 220 can store the uploaded background music for a predetermined time.

Afterwards, the transceiver 110 of the receiving side mobile communication terminal 230 receives the INVITE message including the URL link of the sent call background music (S410), and sets a session with the transmitting side mobile communication terminal 210 by using a SIP (Session Initiation Protocol) on the basis of the sent INVITE message. Accordingly, a PTX traffic state is initiated to enable transmission and reception of an audio message through the thereby set session, which proceeds in the same way as the part of the illustrated operation principle of the system supporting the PTX service of the mobile communication terminal according to the conventional art, and accordingly a detailed explanation therefor is omitted.

Then, the controller 120 may request the call background music from the application server 220 on the basis of the received INVITE message (S420), and downloads the requested call background music to store it in a memory 130 (S430). That is, the controller 120 of the receiving side mobile communication terminal 230 downloads the stored call background music on the basis of the sent INVITE message through the URL link to the background music data file which the transmitting side mobile communication terminal has set, and thusly stores the downloaded call background music in the memory 130.

As a result, the receiving side mobile communications terminal 230 can play the stored call background music through the output unit 140 (S440). That is, the transmitting side mobile communication terminal 210 transmits the INVITE message including the URL link of the call background music data file to the receiving side mobile communication terminal 230, and accordingly the receiving side mobile communication terminal 230 can download and play the call background music during the PTX voice conversation for transmitting and receiving multimedia data such as audio, video, text, or the like.

As aforementioned, in the method for setting the background music during the telephone conversation via the mobile communication terminal according to the present invention, by transmitting the INVITE message including the URL link of the call background music data file to the receiving side mobile communication terminal, the background music can be played during the PTX telephone conversation. As a result, it is effective to improve convenience for the user with respect to the PTX service.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communications terminal for setting a background music during a phone conversation, the terminal being a receiving terminal and comprising:
    a transceiver configured to receive a message during a phone conversation, the phone conversation being allowed after establishing a call with a corresponding transmitting terminal, the message including an invitation to download call background music pre-set by a user, the invitation including path information for downloading the call background music, the invitation being rejectable by the receiving terminal; and
    a controller configured to download, in reply to the invitation, the call background music during the phone conversation if the invitation is not rejected by the receiving terminal,
    wherein the call background music is downloaded within a session through a Real Time Protocol (RTP) that supports a Push-to-X (PTX) service,
    wherein the PTX service is at least one of PTT (Push-to-Talk) service, PTV (Push-to-View), and IM (Instant Messaging) service,
    wherein the invitation is an INVITE message including a Uniform Resource Locator (URL) line of the call background music, which is an Extensible Markup Language (XML) text type, and
    wherein the session is set by using a Session Initiation Protocol (SIP) based on the INVITE message.

2. The terminal of claim 1, further comprising:
    a memory configured to store the downloaded call background music; and
    an output unit configured to reproduce the downloaded call background music.

3. The terminal of claim 1, wherein the controller is configured to upload the call background music to an application server.

4. The terminal of claim 1, wherein the call background music comprises a plurality of different call background music data files.

5. The terminal of claim 1, wherein the path information is a Uniform Resource Locator (URL) link.

6. The terminal of claim 5, wherein the URL link of the call background music is an Extensible Markup Language (XML) text type.

7. A method for setting a background music during a phone conversation, the method comprising:
    receiving, by a receiving terminal, a message during a phone conversation, the phone conversation being allowable after establishing a call connection with a corresponding transmitting terminal, the message including an invitation to download call background music pre-set by a user, the invitation including path information for downloading the call background music, the invitation being rejectable by the receiving terminal; and in reply to the invitation, downloading the call background music by the receiving terminal during the phone conversation if the invitation is not rejected by the receiving terminal, wherein the call background music is downloaded within a session through a Real Time Protocol (RTP) that supports a Push-to-X (PTX) service, wherein the PTX service is at least one of PTT (Push-to-Talk) service, PTV (Push-to-View), and IM (Instant Messaging) service, wherein the invitation is an INVITE message including a Uniform Resource Locator (URL) line of the call background music, which is an Extensible Markup Language (XML) text type, and wherein the session is set by using a Session Initiation Protocol (SIP) based on the INVITE message.

8. The method of claim 7, further comprising: storing the downloaded call background music; and reproducing the stored call background music.

9. The method of claim 7, wherein the call background music comprises a plurality of different call background music data files.

10. The method of claim 7, wherein the path information is a Uniform Resource Locator (URL) link.

11. The method of claim 10, wherein the URL link of the call background music is an Extensible Markup Language (XML) text type.

12. A mobile communications system for setting a background music during a phone conversation, the system comprising:

a transmitting side mobile communication terminal configured to send a message to an application server, the message including an invitation to download call background music, the invitation including path information for downloading the call background music; and a receiving side mobile communication terminal configured to receive the invitation during the phone conversation, the invitation being rejectable by the receiving side mobile communication terminal, and download the call background music during the phone conversation in reply to the invitation if the invitation is not rejected by the receiving side mobile communication terminal, the phone conversation being allowable after establishing a call connection between the transmitting and receiving side mobile communication terminals, wherein the call background music is downloaded within a session through a Real Time Protocol (RTP) that supports a Push-to-X (PTX) service, wherein the PTX service is at least one of PTT (Push-to-Talk) service, PTV (Push-to-View), and IM (Instant Messaging) service, wherein the invitation is an INVITE message including a Uniform Resource Locator (URL) line of the call background music, which is an Extensible Markup Language (XML) text type, and wherein the session is set by using a Session Initiation Protocol (SIP) based on the INVITE message.

13. The system of claim 12, wherein the transmitting side mobile communication terminal is configured to upload the call background music to the application server.

14. The system of claim 12, wherein the application server is one of a PTX server or a presence server.

15. The system of claim 14, wherein the PTX server is one of a Push To Talk (PTT) server, a Push To View (PTV) server, and an Instant Message (IM) server.

16. The system of claim 12, wherein the receiving side mobile communications terminal is configured to store the downloaded call background music and to reproduce the stored call background music.

17. A method for setting a background music during a phone conversation via a mobile communication terminal, the method comprising:

sending a message from a transmitting side mobile communication terminal to an application server, the message including an invitation to download call background music, the invitation including path information for downloading the call background music; and receiving the message by a receiving side mobile communication terminal during the phone conversation, the invitation being rejectable by the receiving side mobile communication terminal, and downloading the call background music by the receiving side mobile communication terminal during the phone conversation in reply to the invitation if the invitation is not rejected by the receiving side mobile communication terminal, the phone conversation being allowable after establishing a call connection between the transmitting and receiving side mobile communication terminals, wherein the call background music is downloaded within a session through a Real Time Protocol (RTP) that supports a Push-to-X (PTX) service, wherein the PTX service is at least one of PTT (Push-to-Talk) service, PTV (Push-to-View), and IM (Instant Messaging) service, wherein the invitation is an INVITE message including a Uniform Resource Locator (URL) line of the call background music, which is an Extensible Markup Language (XML) text type, and wherein the session is set by using a Session Initiation Protocol (SIP) based on the INVITE message.

18. The method of claim 17, wherein the transmitting side mobile communication terminal uploads the call background music to the application server.

19. The method of claim 17, wherein the application server is one of a PTX (Push-To-X) server or a presence server.

20. The method of claim 19, wherein the PTX server is one of a Push To Talk (PTT) server, a Push To View (PTV) server, and an Instant Message (IM) server.

21. The method of claim 17, further comprising:

storing the downloaded call background music by the receiving side mobile communications terminal; and reproducing the stored call background music by the receiving side mobile communications terminal.

* * * * *